United States Patent [19]

Gervasio et al.

[11] Patent Number: 4,556,801

[45] Date of Patent: Dec. 3, 1985

[54] METHOD FOR UTILIZING WIND ENERGY FOR AUTONOMOUS ELECTRICITY PRODUCTION

[75] Inventors: Vincenzo Gervasio; Antonio Rossi, both of Milan, Italy

[73] Assignee: Snamprogetti S.p.A., Milan, Italy

[21] Appl. No.: 390,502

[22] Filed: Jun. 21, 1982

[30] Foreign Application Priority Data

Jul. 7, 1981 [IT] Italy .............................. 22777 A/81

[51] Int. Cl.$^4$ ................................................ F03D 9/00
[52] U.S. Cl. ........................................ 290/44; 290/55
[58] Field of Search .................................... 290/44, 55

[56] References Cited

U.S. PATENT DOCUMENTS 4,112,311 9/1978 Theyst .................................. 290/55
4,239,977 12/1980 Strutman .............................. 290/44

Primary Examiner—William M. Shoop, Jr.
Assistant Examiner—W. E. Duncanson, Jr.
Attorney, Agent, or Firm—Hedman, Gibson, Costigan & Hoare

[57] ABSTRACT

A method for utilizing wind energy for electricity production based on a wind motor and an auxiliary direct current electric motor coupled by an angular speed summation mechanism to an alternating current electric generator maintained at constant speed.

The generator can be connected to a power grid or can supply local user appliances by means of a circuit to which other constant frequency generators are either connected or not. If connected to the power grid or to other generators, electricity can be produced at constant frequency by the wind with high efficiency by modulating the power supplied by the auxiliary electric motor. In the case of isolated operation, a low priority user appliance which can be modulated over a certain range has also to be provided in order to produce wind electricity under optimum conditions.

9 Claims, 5 Drawing Figures

Fig. 2
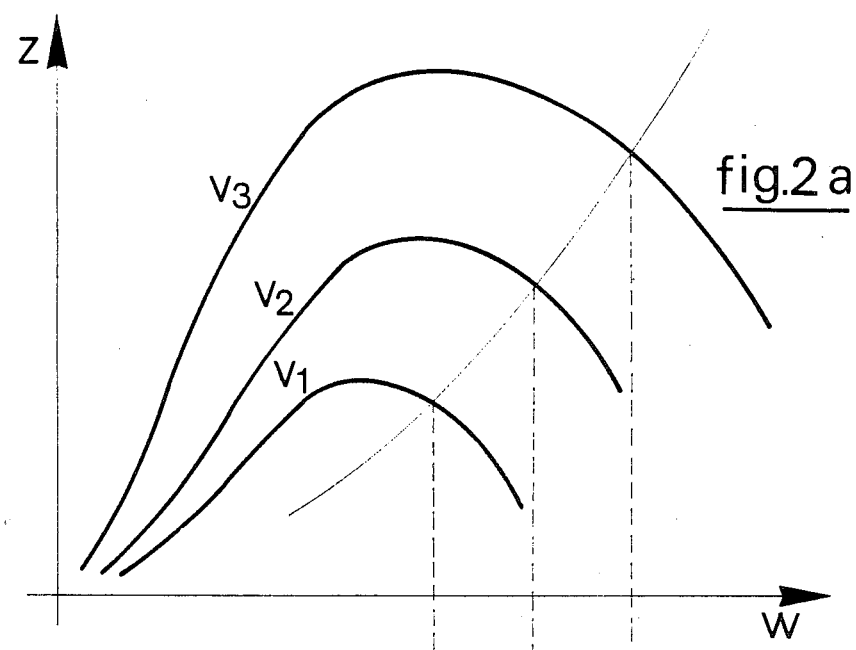
fig.2a
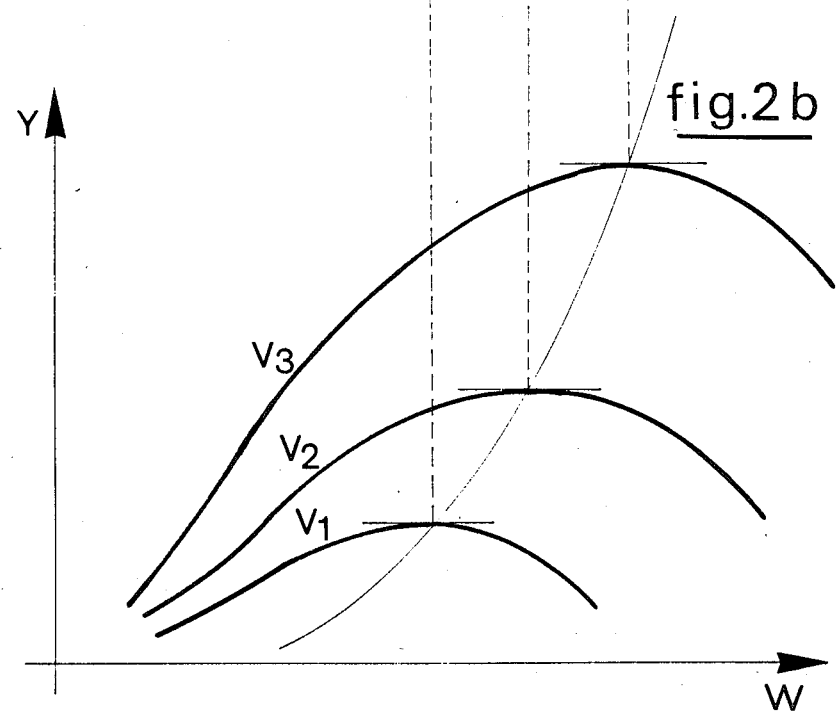
fig.2b

METHOD FOR UTILIZING WIND ENERGY FOR AUTONOMOUS ELECTRICITY PRODUCTION

This invention relates to a method for utilising wind energy for constant frequency electricity production. The main difficulty which has to be confronted when using wind energy for electricity production derives from the extreme variability of the wind, which is poorly adaptable to covering an electricity demand pattern which follows a completely different logic.

Various types of accumulation system have been widely studied and experimented, even with good results, but these often impose very demanding constraints on the system, which often become costly in terms both of its construction and operation.

It would be possible to use the wind energy as the sole source of electricity (direct coupling between the wind rotor, synchronous or induction generator and power grid), but this would produce maximum utilisation of the wind power only within a determined speed range, thus leading to a low average efficiency of the system. This problem could be solved only by using very complicated devices (rotor with mobile blades, sophisticated control systems etc.) which would inevitably result in high construction and maintenance costs. If a wind rotor of the fixed blade type (and thus strong and reliable) is used, supplementary energy has to be supplied in order to keep the wind rotor speed in the state for maximum utilisation of the wind energy as the wind speed varies. A fixed blade wind rotor can absorb wind power under optimum conditions at an angular speed which depends on the wind speed. Consequently, if optimum wind power absorption conditions are to be preserved it is impossible to rotate at constant speed an electrical generator directly connected to the wind rotor shaft.

According to the U.S. Pat. appln. No. 298.283 filed on Sept. 1, 1981 this supplementary energy supply is provided by a prime mover, for example an internal combustion engine, the feed to which is governed by the need to maintain the required angular speed.

The method of the present invention provides for coupling the wind rotor to a direct current electric motor and to an electrical generator, which is maintained at constant speed. This coupling is made by an angular speed summation device. The method according to the invention can also obviously be attained by an interconnected system consisting of one or more wind rotors, one or more auxiliary direct current electric motors and one or more electrical generators. Several interconnected electrical elements can allow improved system modulation for the purposes of efficiency.

In the drawings,

FIGS. 2A and 2B are curves of rotor torque and power, respectively, vs rotor speed for various wind speeds.

Figure 1:
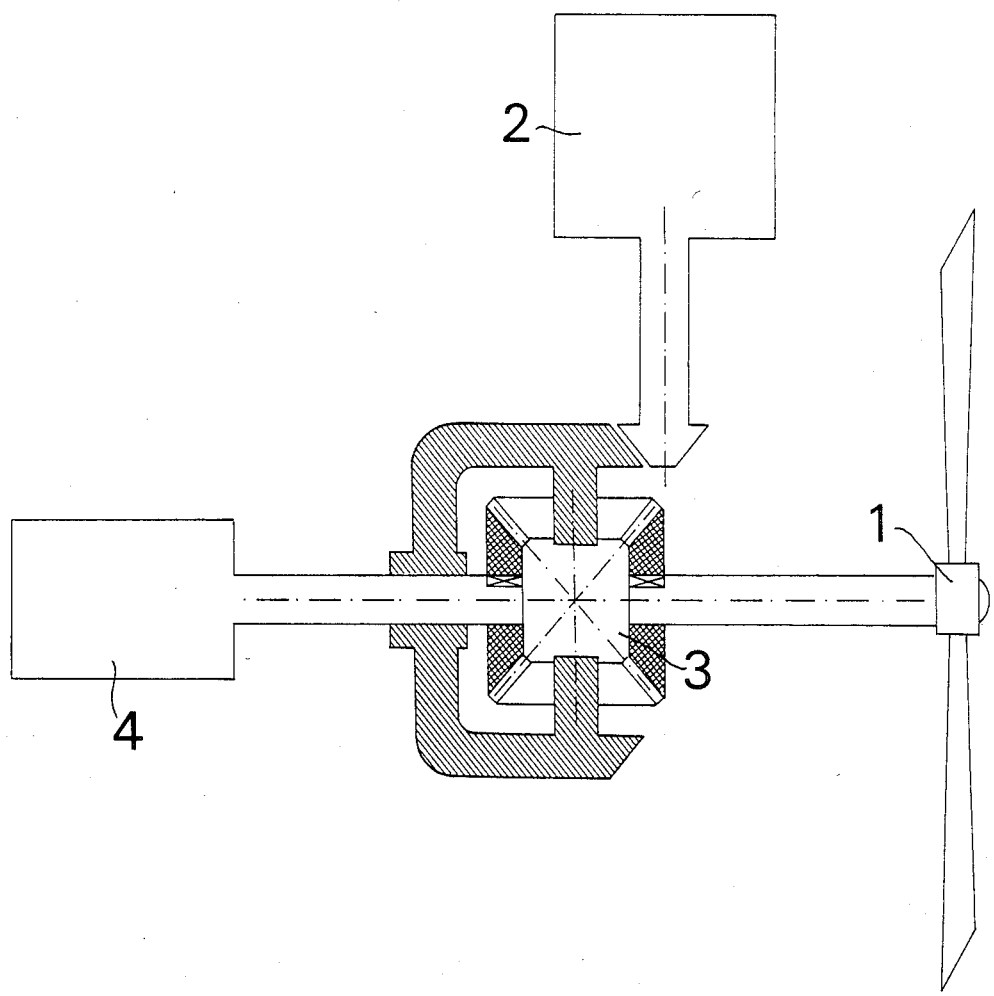
FIG. 1 is a schematic view of the wind energy generator according to the present invention.

The spirit and scope of the present invention will be more apparent from the description given hereinafter of a typical embodiment with reference to FIG. 1.

The mechanical connection of the three component parts, the electricity generator 2, the auxiliary electric motor 4 and the wind rotor 1, is provided by the differential gear 3, the planet-carrier of which 5, is connected to the generator 2, and by the two half-axles 6 and 7 which are connected, the former to the motor 4 and the latter to the wind rotor 1.

The planet-carrier 5 has a cuplike outline, the upper edge of which is a bevel ring gear which is in constant mesh with the bevel gear of 2.

The two planetary gears 8A and 8B are idly mounted on the two pins 9A and 9B, respectively. Planetary gear 8A and 8B mesh with the bevel gears 10 and 11. Bevel gears 10 and 11 conversely, are permanently keyed to the half-axles 6 and 7, respectively.

With this coupling arrangement, the differential operates as an angular speed summation device such that on suitably varying the rotational speed of 4, the variation in the rotational speed of 1 can be compensated by transmitting to the generator 2 a power equal to the sum of the two instantaneous powers of 4 and 1 at constant angular speed. The generator 2 should be driven at a speed which is as constant as practicable, this means that the planet-carrier 5 should be rotated at a constant angular speed about 6.

Consequently, the half-axle 6, and thus the motor 4, should be rotated in such a way that the RPM must be varied so as to compensate the variations of the RPM of the wind rotor (1).

Stated another way, the RPM of 4 is servoed to the RPM of 2. In this way, the angular speed of the generator is greater than or equal to the angular speed of the wind rotor.

FIG. 2 shows the variation in the torque Z (FIG. 2A) and power Y (FIG. 2B) of the wind rotor (of fixed blade type) as its angular speed varies, for various wind speeds ($V_1$, $V_2$, $V_3$).

FIG. 2B also shows the curve which joins together all points of maximum wind rotor power.

FIG. 2A shows the analogous curve which joins together all torque values corresponding to maximum power.

If the angular speed of the wind rotor can be suitably varied as the wind speed varies, then the wind rotor can always operate under maximum power conditions.

Figure 3:
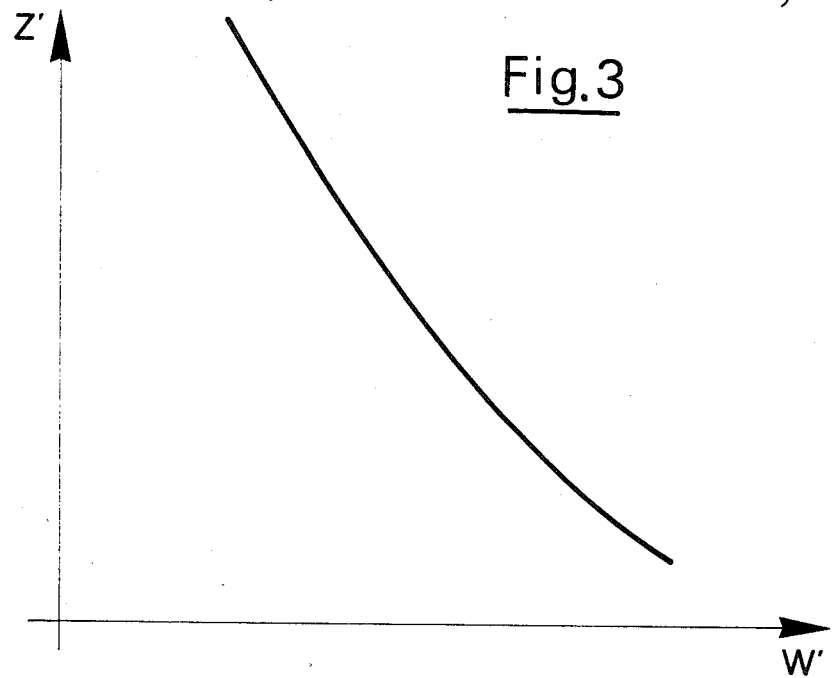
FIG. 3 is a curve or torque vs speed for the electric motor used in the invention.

By suitably choosing the electric motor and its characteristic curve (torque as a function of angular speed), it is possible to obtain a variation in the torque (Z') with angular speed (W') of the type shown in FIG. 3, and which is perfectly analogous to the curve shown in FIG. 2A (except for the direction of the axis W' compared with the direction of the axis W).

This is possible for example with an independently excited direct current motor, in which coordinated control both of the armature voltage and of the excitation is carried out as a function of the angular speed.

Figure 4:
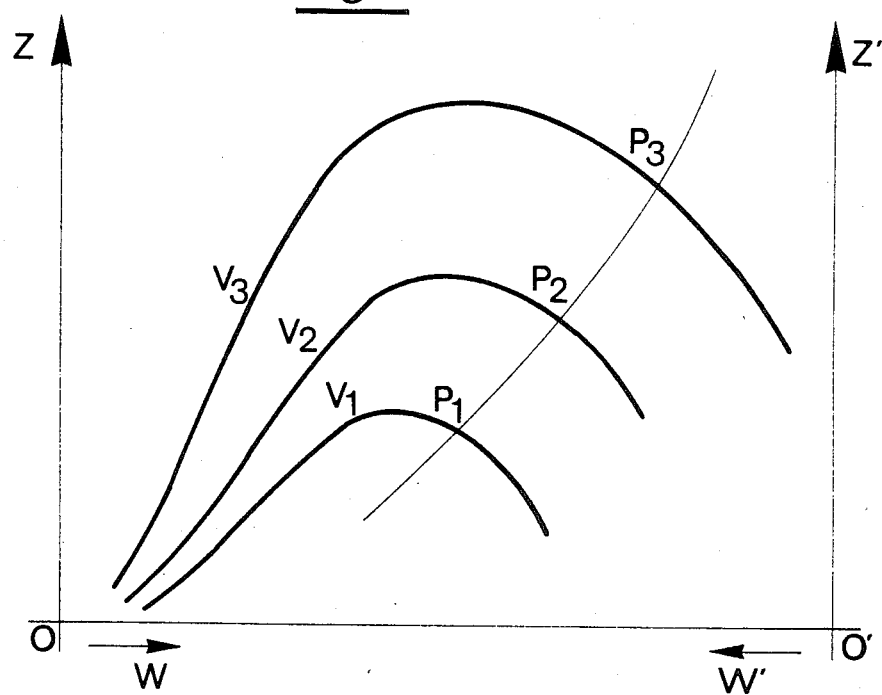
FIG. 4 is a combination of FIGS. 2A and 3 showing points of stable operation.

Thus if such an electric motor is coupled by the angular speed summation mechanism shown in FIG. 1 to a wind rotor and to an electrical generator connected to a power grid in which the frequency is fixed, the conditions illustrated in FIG. 4 are obtained, in which the abscissa axis represents the angular speed W of the wind rotor from left to right starting from O, and the angular speed of the auxiliary electric motor from right to left starting at O'. The Z axis shows the wind rotor torque as the angular speed of the wind rotor varies, for three values of the wind speed ($V_1$, $V_2$, $V_3$), and the Z' axis shows the electric motor torque as the angular speed of the electric motor varies. The segment OO' represents the sum (constant) of the two angular speeds, which is transmitted to the generator by means of the summation mechanism.

The points indicated in FIG. 4 by $P_1$, $P_2$, $P_3$ represent points of stable operation of the system as the wind speed varies, and because of the correspondence between the characteristic curve of the chosen electric motor and the curve of FIG. 2a which joins together the points in which the torque of the wind rotor corresponds to its maximum power, the effect is that as the wind varies, the wind rotor coupled in this way to the electric motor always operates at maximum power.

If the system is connected to user appliances by a circuit not connected to other generators, there is disappearance of the regulating effect of the power grid on the frequency due to the synchronising torque of the generator, and consequently the sum of the angular speeds of the two motors (wind and electric), represented in FIG. 4 by the segment 00', can be kept constant only by maintaining the overall load on the generator constant, and this is possible by utilising a user appliance which is of low priority and can therefore be modulated.

The electricity necessary for driving the auxiliary direct current electric motor (motor 4 of FIG. 1) can be derived from the power grid or alternately be produced by said generator 2 of FIG. 1, rectified and then fed to the auxiliary motor.

Alternatively, direct current can be generated directly, by connecting a dynamo (in addition to the generator 2) to the system together with a system of buffer batteries to act as a storage system.

Direct current electricity can also be generated by a further conventional fixed blade air motor connected to a battery system and installed in an assembly with one or more other air motors provided with the device of the present invention. Finally, direct current can be produced by a photovoltaic generator connected to the system.

We claim:

1. A method for utilizing wind energy for constant frequency electricity production, characterised in that a wind rotor is coupled by means of an angular speed summation mechanism to an auxiliary direct current electric motor and to a generator which is maintained at constant angular speed, the angular speed of said generator being greater than or equal to the angular speed of such wind rotor said summation mechanism comprising a differential having a pinion spider connected to said generator and two axles, the first of said two axles connected to said auxiliary electric motor and the second of said two axles connected to said wind rotor.

2. A method for utilizing wind energy for constant frequency electricity production, as claimed in claim 1, wherein said auxiliary direct current electric motor has a torque dependent on angular speed, which maintains said wind rotor at a speed representing maximum power conditions.

3. A method for utilizing wind energy as claimed in claim 2, wherein said auxiliary direct current electric motor is of the independent excitation type, both the armature voltage and the excitation being controlled in a coordinated manner in accordance with the annular speed.

4. A method for utilizing wind energy as claimed in claim 3, wherein power supplied to the auxiliary direct current electric motor is derived from a power grid, rectified and then fed to said auxiliary motor.

5. A method for utilizing wind energy as claimed in claim 3, wherein power supplied to said auxiliary direct current electric motor is derived from said generator, rectified and then fed to said auxiliary motor.

6. A method for utilizing wind energy as claimed in claim 3, wherein power supplied to said auxiliary direct current electrical motor is produced by a dynamo connected to the electric system.

7. A method for utilizing wind energy as claimed in claim 3, wherein power supplied to said auxiliary direct current electric motor is produced by an auxiliary air motor connected to the electrical system.

8. A method for utilizing wind energy as claimed in claim 3, wherein power supplied to said auxiliary direct current electric motor is obtained from a photovoltaic system.

9. A method for utilizing wind energy as claimed in claim 3, wherein power supplied to said auxiliary direct current electric motor is connected to a buffer battery system acting as an accumulation system.

* * * * *